United States Patent [19]

Stanley et al.

[11] Patent Number: 5,001,893
[45] Date of Patent: Mar. 26, 1991

[54] TRACTOR POWERED NUT HARVESTER

[75] Inventors: Glenn A. Stanley, Durham; Robert J. Sousa, Chico, both of Calif.

[73] Assignee: Weiss/McNair Inc., Chico, Calif.

[21] Appl. No.: 546,716

[22] Filed: Jul. 2, 1990

[51] Int. Cl.⁵ ............................................. A01D 51/00
[52] U.S. Cl. ..................................... 56/328.1; 56/16.5
[58] Field of Search .................. 56/16.5, 328.1, 340.1, 56/327.1, DIG. 8; 171/17

[56] References Cited

U.S. PATENT DOCUMENTS

| | | | |
|---|---|---|---|
| 3,182,437 | 5/1965 | Ramacher et al. | 56/328.1 |
| 3,387,442 | 6/1968 | Henson | 56/328.1 |
| 3,872,657 | 3/1975 | Ramacher et al. | 56/328.1 |
| 4,642,977 | 2/1987 | Ramacher | 56/328.1 |

FOREIGN PATENT DOCUMENTS 1355876  6/1974  United Kingdom ............... 56/328.1

Primary Examiner—Ramon S. Britts
Assistant Examiner—David J. Bagnell

[57] ABSTRACT

A wheel mounted harvester having a tow hitch at each end thereof for towing by a tractor, and to allow the harvester to simultaneously tow a harvest trailer. The harvester is used in orchards to pick-up nuts for deposit into the trailer towed by the nut harvester. Crop pick-up and cleaning mechanics on the harvester are powered by the power-take-off unit of the towing tractor. The harvester structure uses a pulley and vertically oriented drive belt arrangement at the front end of the harvester to transfer power from the power-take-off shaft to a support shaft of a suction fan and hydraulic fluid pump mounted thereto. The suction fan and housing therefor is mounted at the center front end of the harvester. Affixed to the fan housing and extending rearward therefrom is an elongated vacuum chamber leading centrally into a debris separation chamber. One short drive chain and sprocket arrangement, and three hydraulic motors with fluid lines are used for transferring power to components of the harvester located away from the front end of the harvester. The hydraulic motors provide power to a crop pick-up conveyor disposed adjacent the ground, a dirt removal conveyor, and an off-load elevator aligned with the trailer under tow.

14 Claims, 7 Drawing Sheets

TRACTOR POWERED NUT HARVESTER

BACKGROUND OF THE INVENTION

1. Field of the Invention:

This invention relates to an improved nut pick-up harvester which is towed behind a tractor, and powered by a power-take-off unit of the towing tractor. The nut harvester of this disclosure is used in orchards to pick-up nuts or other ground-laid agricultural crops for deposit into a harvest trailer towed by the harvester.

2. Description of the Prior Art:

A past art search was conducted at the U.S. Patent and Trademark Office to examine nut harvesters and pick-up machines similar to ours. None of the nut harvesters found in the patent search, or of the harvesters we are aware of in use in the field, including past art nut harvesters we have manufactured and sold, are as simply structured while offering comparable harvesting capabilities, energy efficiencies, and safety as the nut harvester of this disclosure.

The following past art references refer to harvesters we consider somewhat similar to our harvester. The references are further considered useful in exemplifying typical past art problems, and structural similarities and differences between our harvester, and harvesters of the past.

A U.S. Pat. No. 3,182,437, issued May 11, 1965 to L. Ramacher et al teaches a self-propelled "NUT HARVESTER". The Ramacher nut harvester utilizes a motor mounted to a wheel supported frame to propel the harvester through an orchard during harvesting. The motor is further utilized to power a plurality of crop pick-up and cleaning devices on the harvester. The Ramacher harvester is somewhat typical of many harvesters, having several long horizontally disposed drive chains and belts with support sprockets and pulleys used to transfer power from the frame mounted motor to the various crop pick-up and cleaning devices.

A U.S. Pat. No. 3,387,442, issued June 11, 1968 to J. A. Henson teaches a "NUT HARVESTING MACHINE". The harvester of this patent is a self-propelled vehicle having an engine mounted to the wheel supported frame thereof. This harvester again uses many drive chains, sprockets, and pulleys and belts to actuate the various movable components for harvesting. In addition to the belts and chains, this harvester also uses several gear containing differential units. The use of differential units and gear boxes is common to many past art nut harvesters.

A U.S. Pat. No. 3,872,657, issued Mar. 25, 1975 to Barry Ramacher et al teaches a "HARVESTER PICK-UP". This Ramacher harvester is primarily a self-propelled harvester having an operator's seat and steering wheel, although it is anticipated it could be towed by a tractor. The Ramacher harvester has an engine mounted to the wheel support frame to power the various brushes, chains, and the debris removal fan. Although the engine is apparently not clearly shown in relative placement to the other harvester components, the fan, rotary brushes and chains of the harvester are shown spaced apart from one another at oppositely disposed ends of the harvester. This harvester apparently also uses many long drive belts and chains to extend to and power the various rotatable components of the machine.

It should also be noted this particular Ramacher harvester utilizes a fan mounted off to one side of the harvester, with the fan supported by a fan support shaft which extends crosswise of the harvester. The fan is also mounted in very close proximity to the mixture of debris and nuts moving through the harvester. The positioning of this "off-center" and "close proximity" fan is typical of many past art harvesters, and in our opinion leads to much slower and less thorough debris removal, and a loss of valuable nuts. Nuts and debris are usually moved through the center length of a harvester on cleated and usually apertured belts or chain conveyors. With the use of an off-center fan, is it very difficult to supply an evenly distributed level of suction or air pressure against the mixture of nuts and debris in a debris removal chamber.

SUMMARY OF THE INVENTION

In practicing our invention, we have structured an improved harvester primarily for picking-up nuts placed in windrows in an orchard. Our harvester is structured to be towed behind a tractor, and powered by the power-take-off unit (PTO) of the towing tractor. The nuts may be almonds, walnuts, pecans, or filberts for example, although the harvester may also be used for fruits such oranges, lemons, and the like, providing they are on the ground. Our nut harvester is less expensive to manufacture and maintain than similar past art harvesters having somewhat comparable harvesting capabilities, and further, is safer and more fuel efficient to operate, while at the same time providing increased pick-up, cleaning and debris removal rates. The nut harvester of this disclosure is considered to be a "full size" commercial harvester, being capable of quickly moving down windrows, picking-up large quantities of nuts and the always present mixture of leaves, sticks and other debris in a short period of time.

The preferred structure of our harvester uses no gear boxes or geared differential boxes. Our harvester uses just one pulley and vertically oriented drive belt arrangement at the front of the harvester, a minimal or low number of sprockets, just one "short" drive chain restricted to one compact area, and three hydraulic motors and fluid lines for transferring power to all of the components of the harvester located away from the front end which need power. The hydraulic motors and the use of centering type hydraulic control valves provide independent, variable power to a front end pick-up conveyor, an apertured dirt removal conveyor, and an off-load elevator. Our structuring eliminates most of the dangerous, high maintenance drive chains and belts as well as minimizing the number of sprockets and pulleys to be carefully aligned during manufacturing.

A centrally positioned, single suction fan mounted at the front end of our harvester and connected to an elongated vacuum chamber leading into the center of a debris separation air chamber in the center of the harvester provides high, evenly distributed and controllable suction for fast, thorough debris removal without wasting nuts. We have found that a fan should be centered both in a vacuum chamber, and the vacuum chamber should enter into the center of a debris separation chamber, and further that the fan should be placed a significant distance away from the point where the vacuum chamber enters the debris separation chamber. Consequently, we placed our fan centered at the front end of our harvester to provide high, evenly applied suction, and to take advantage of the adjacent PTO power connection between the tractor and the front of our harvester. This structuring allows the providing of an unusually direct and efficient connection between the PTO input shaft and the support shaft of the fan.

The one pulley and vertically oriented drive belt arrangement of our harvester is located at the front end of the machine. The pulley and drive belt arrangement is utilized to couple power from the rotating PTO shaft to the support shaft of the front suction fan, eliminating the necessity of long horizontally disposed drive belts, chains or drive shafts typically used on many past art harvesters to provide power to suction fans mounted more rearward on the harvester. Our pulley and drive belt arrangement is necessitated by the normally low RPM output of a typical tractor PTO, and the relatively high RPM requirement for properly operating the suction fan of a nut harvester. In view of this, the pulley and drive belt arrangement is primarily for gearing purposes, and of course is well shrouded for safety.

Our centered front suction fan, the dirt removal conveyor, and multiple free-fall dropping of the crop and debris from one conveyor to another within the debris separation chamber is some of the structuring which provides our harvester with improved debris removal and faster harvesting capabilities. The multiple free-fall dropping of the crop and debris from one conveyor to another is to break up any interlocking between the items allowing more efficient debris removal.

The use of very few of sprockets and just one "short" drive chain on our harvester is based on the economic feasibility of eliminating these components altogether in the particular area where they are located on our harvester. It is not always feasible, taking everything into account, to completely eliminate all drive belts, sprockets and drive chains from a harvester of this type. However, the sprockets and one short drive chain we use as a part of our harvester are located in one very small area. Our sprocket and drive chain arrangement is located in a compact area adjacent a rotating support shaft of the pick-up conveyor of the harvester which is powered by one of the three hydraulic motors of the harvester. The rotating support shaft of the pick-up conveyor being in an adjacent area provides a feasible source of power to harness with sprockets and a drive chain to apply power to a front feeder wheel located in front of, and in close proximity to the pick-up conveyor. Therefore, since the sprockets and drive chain may be located in a very compact area, and a rotatable power source is readily available close by, it was deemed quite cost effective and yet still safe to use the sprockets and drive chain in this particular instance, and install a necessarily small safety guard thereover, rather than to purchase an additional hydraulic motor, which would work, however, the additional motor would increase the cost of manufacturing our harvester by several hundred dollars. When sprockets and drive chains are in a small compact area, it becomes much less expensive to install proper safety shrouds over the chains as compared to placing guards over long, horizontally disposed drive chains or belts which reach from one end of the harvester to the other, as is typical of many past art harvesters.

Additionally, a hydraulic pump is coupled to and powered by the rotating support shaft of the suction fan at the front of the harvester where sufficient power at a suitable RPM is available for operating the pump. The hydraulic pump and a hydraulic fluid reservoir therefore, located at the front of our harvester provides pressured fluid through hydraulic lines to power the three hydraulic motors located at various, more rearward places on the harvester.

Hydraulics are one of the most safe and energy efficient methods of transferring power from one location to another. It should be noted it is very difficult to be injured by hydraulic fluids lines. Hydraulic motors are available today in a variety of sizes and mounting structures. By attaching a hydraulic motor directly over the rotatable drive shafts of certain components of our harvester, we have eliminated all of the long, horizontally disposed drive belts and chains, and the expensive safety guards which are normally associated with past art harvesters. In eliminating long drive belts and chains, and using individual hydraulic motors on the drive shaft of certain harvester components needing power, the overall safety and fuel efficiency of our harvester has been greatly increased, while at the same time, the expense of building and maintaining our harvester has been dramatically reduced.

A hydraulic motor attached to a rotatable shaft leaves very little in the immediate area of the motor on which to get injured. The rotating shaft of motor and coupling device used to couple the shaft of the motor to the drive shaft of the harvester component is relatively smooth, and can therefore be left exposed without any real danger of a person receiving more than a scrape should he get his hand against the spinning shafts. The drive and support shaft of the component of the harvester driven by the hydraulic motor normally enters directly into a roller support bearing mounted to a metal covering of the component of the harvester, and therefore the rotating drive shaft poses very little hazard to injure a person. The drive and support shaft of the component of the harvester leaves the support bearing and enters into the shrouded area where the work is performed by the component, which is usually a conveyor chain, belt or paddle wheel. It should be noted that the shrouding of the shrouded work area is normally not exclusively shrouding for safety purposes, but rather, primarily necessary for containing nuts and suction pressures, and therefore can not be eliminated to cut costs as we have done with the vast majority of "safety" shrouding associated with past art harvesters.

The use of hydraulic motors on our harvester in combination with the front, center mounted suction fan, and the one pulley and drive belt arrangement for the fan, has also completely eliminated all of the expensive to buy and operate gear boxes and differentials associated with past art harvesters. Few manufacturers of this type of harvesting equipment, if any, have their own foundries for casting the large number of components of a gear box or geared differential, and therefore must buy these components at a relatively high cost as compared to items they can manufacture in their own factory.

Also, it should be noted that the use of long horizontally disposed drive belts and chains which reach from one end of the harvester to the other, a common arrangement with many past art harvesters, usually extend across or cover other parts which must be periodically serviced and tested after or during servicing. Servicemen must remove the safety shrouds, and often find themselves reaching through a long belt or chain loop to access parts further toward the center of the harvester. It is this reaching through belt and chain loops which has lead to severed arms and fingers. By eliminating these long loops of drive belts and chains as much as is feasibly possible, and intentionally placing serviceable parts where a serviceman hopefully won't have to reach through a chain or belt loop to service a part, we have greatly increased the overall safety of our harvester.

It is therefore a primary object of our invention to provide an improved nut harvester being less costly to manufacture and maintain, while at the same time having improved safety, debris removal, and harvesting rates.

It is a further object of our invention to provide the above in a harvester which consumes less power to operate for the amount of work performed as compared to past art harvesters.

It is a further object of our invention to provide the above in a harvester which has a suction fan mounted at the front center of the harvester, with an elongated vacuum chamber leading from the fan housing rearward into the center of a debris separation chamber to provide evenly distributed, high levels of suction across the entire mixture of nuts and debris.

The many other objects and advantages of our invention will be recognized by those skilled in the art with a reading of the remaining specification and claims, and by examination of our drawings of the preferred embodiment of the invention.

DESCRIPTION OF THE PREFERRED EMBODIMENT

Figure 7:
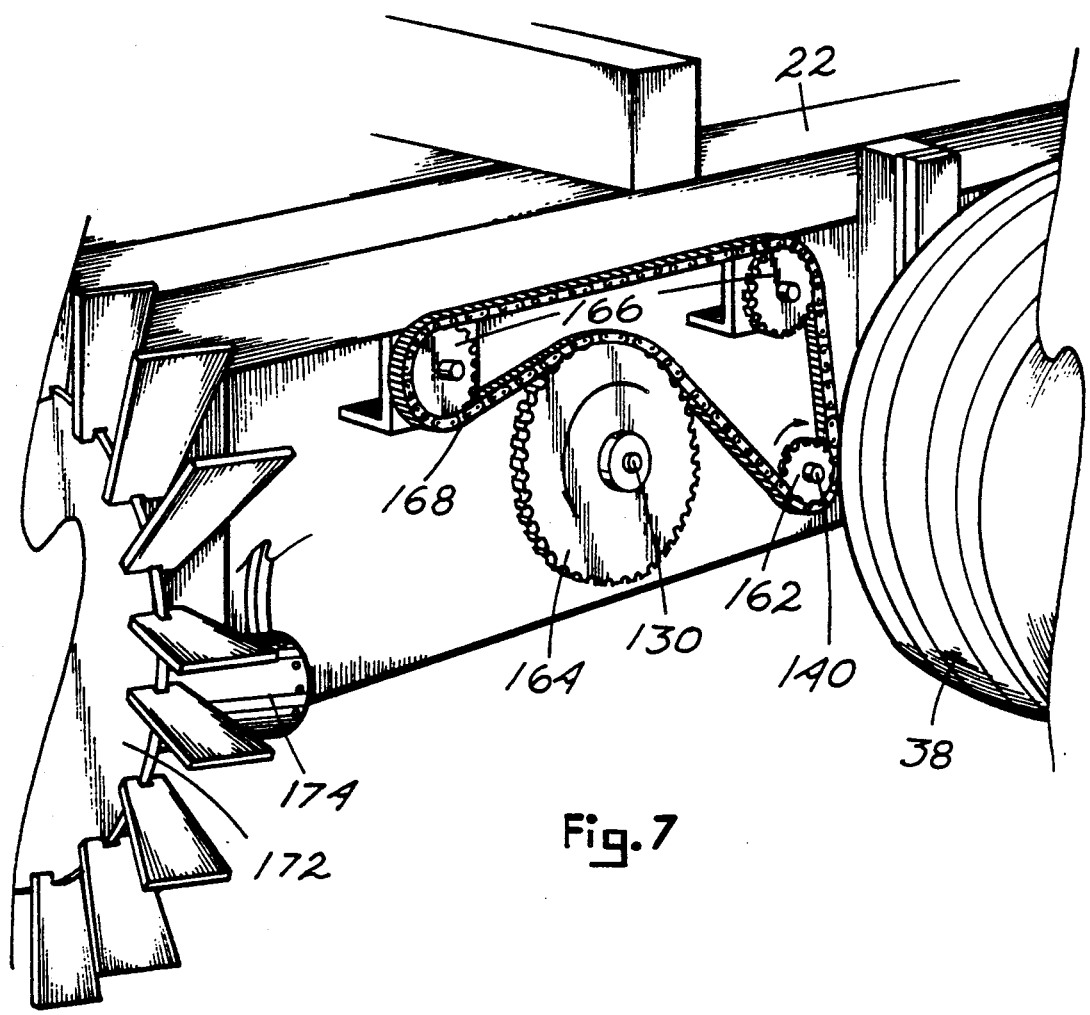
FIG. 7 illustrates the one drive chain and sprocket arrangement used on the preferred embodiment of our harvester.
Figure 8:
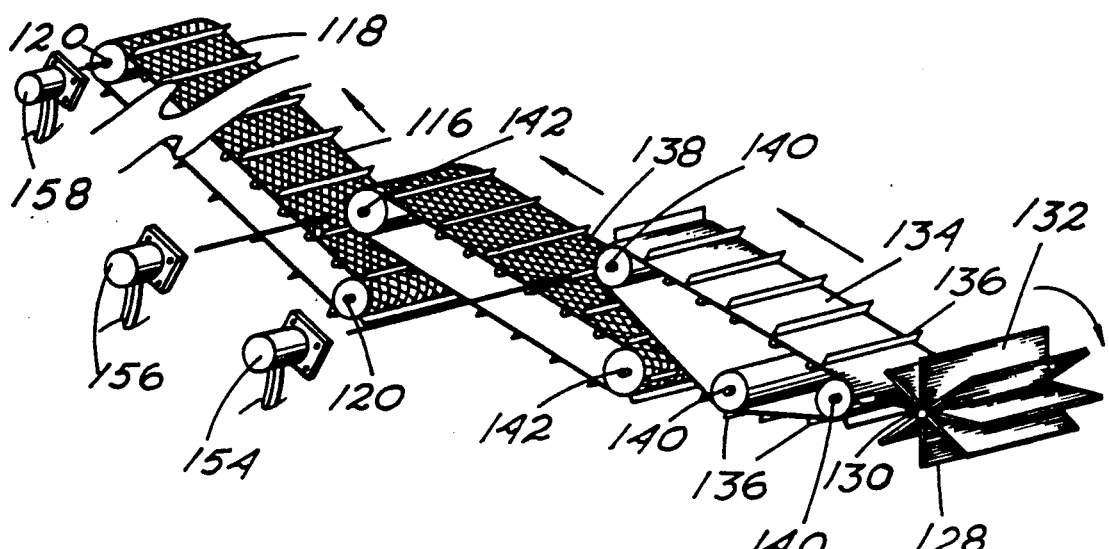
FIG. 8 is further intended to illustrate the placement of the feeder wheel, pick-up conveyor, dirt removal conveyor, and the off-load elevator relative to each other.
Figure 9:
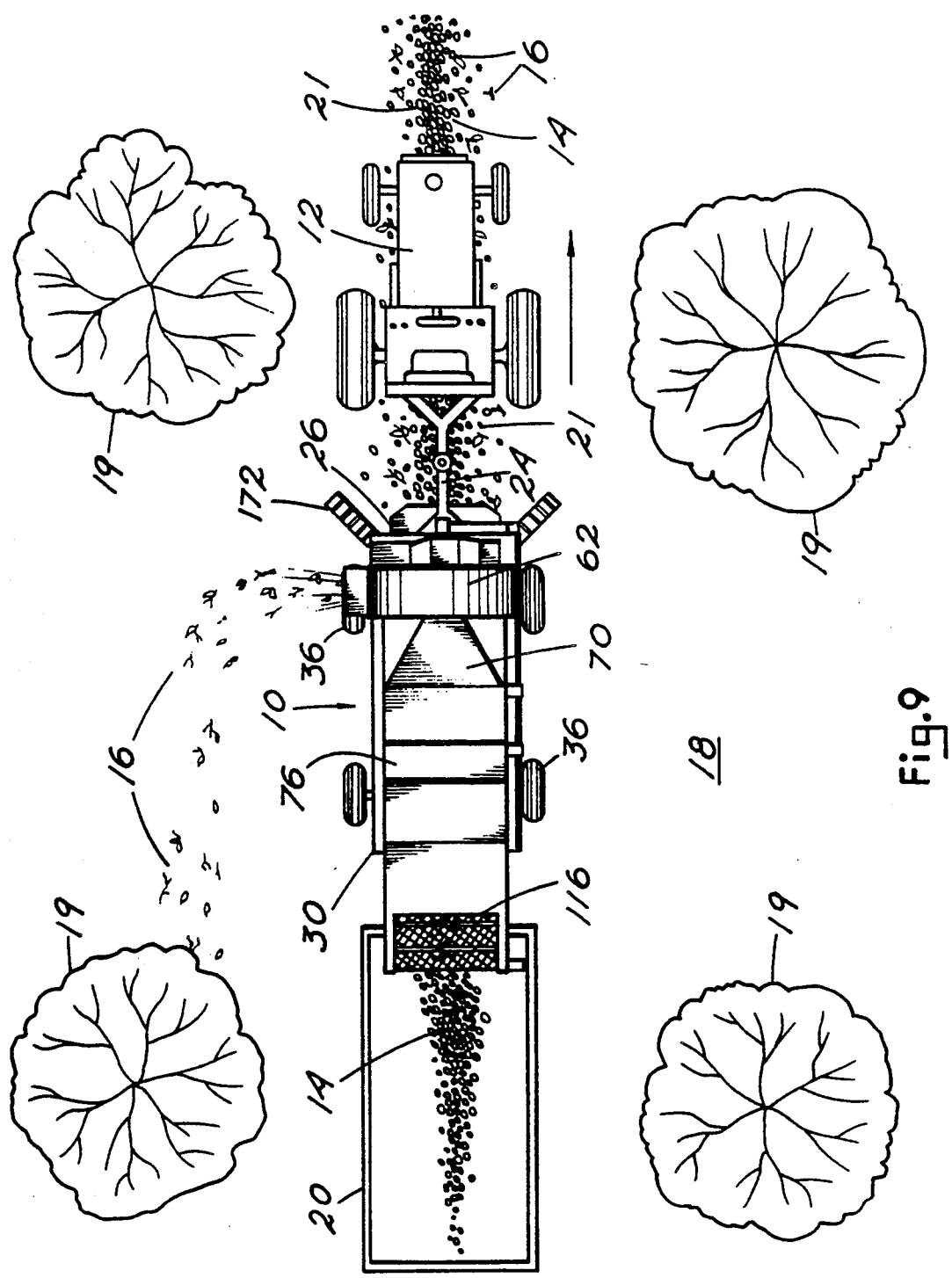
FIG. 9 is a top view of a tractor towing our nut harvester, with our nut harvester towing a harvest trailer during the harvesting of nuts in an orchard of trees.

Referring now to the drawings where our improved harvester 10 is shown in FIG. 1 through 4 as a complete harvester structure from different side and end views; with views of some individual components of harvester 10 in FIG. 5 through 8, and in use in FIG. 9. As stated above, our harvester 10 is adapted for towing through an orchard of trees 19 by a tractor 12 to pick-up agricultural items 14 such as nuts which are already in windrows 21. Tractor 12 must be equipped with a power-take-off unit to be useful with our harvester 10. The agricultural items 14 in orchards are generally always mixed on the ground with debris 16 such as leaves, rocks, dirt, and small branches. The mixture of agricultural items 14 and debris 16 are lifted from the ground 18 by harvester 10, conveyed rearward by and through harvester 10 using a series of aligned yet separate conveyors. A combination of apertures in the conveyors, dropping of the mixture from one conveyor to another, and carefully directed suction and air currents provided by suction fan 58 removes the majority of debris 16 for discharge back out onto the ground, before agricultural items 14 are deposited into a harvest trailer 20 under tow by harvester 10, as shown in FIG. 9.

The preferred structure of our improved harvester 10 includes a generally elongated steel frame 22 having two tow hitches, one being a front tow hitch 24 affixed to a front end 32 of frame 22 which corresponds with front end 26 of harvester 10, and the other hitch being a rear tow hitch 28 affixed to a rear end 34 of frame 22 at rear end 30 of harvester 10. Rear tow hitch 28 is used to tow harvest trailer 20, and front tow hitch 24 is used to allow towing of harvester 10 by a tractor 12. Frame 22 has four rotatable wheels 36 affixed thereto to provide mobility for towing harvester 10 along a surface. Two front wheels 38, one on each front oppositely disposed side of frame 22, and two rear wheels 40 one on each rear oppositely disposed side of frame 22 are considered sufficient for stability of harvester 10, although it is anticipated it may be possible to use just one rear wheel 40 mounted to the rearward center of frame 22.

Front wheels 38 are preferably attached to frame 22 with structuring allowing height adjustability of front end 26 of harvester 10 towards and away from the ground. This height adjustability is desirable since ground conditions vary in orchards, and by raising and lowering front end 26 it is possible to adjust the height of crop pick-up devices positioned underneath harvester 10 relative to the ground. Height adjustability of some past art harvesters has been accomplished using similar attachment structures for the front wheels. A brief description of one suitable structuring useful for adjustably attaching front wheels 38 to frame 22 will ensue, with reference to FIG. 5. Both front wheels 38 would normally be attached with duplicate structuring placed on oppositely disposed sides of frame 22. A wheel hub 82 is rotatably attached to an axle 84, which in turn is securely affixed to an elongated vertically oriented steel plate 86. Plate 86 is retained against a second elongated vertically oriented steel plate 88 which is in turn is welded to a short extension of frame 22. The retaining together of plate 86 and 88 is accomplished by way of a threaded bolt 90 inserted through an elongated vertically oriented slot 92 in plate 86 above axle 84. Bolt 90 is threaded into a threaded bore at the upper end of plate 88 and tightened to secure the two plates stationary relative to each other. The bottom end of plate 86 is slidably retained for added stability thereof within an open-bottom steel collar 94 welded to the bottom end of plate 88. Welded to the top end of plate 86 is a horizontally disposed steel plate 96 having an aperture centrally therethrough. Welded to the top of plate 88 is a threaded rod 98 which extends vertically upward through the aperture in plate 96. A nut 100 is threaded onto rod 98 and abutted against the top surface of plate 96. In order to lower frame 22 and the front end of harvester 10 relative to both axle 84 and the ground, nut 100 is backed away from plate 96, then bolt 90 is loosened. Assuming the loosening procedure has been followed on both front wheel attachments, front end 26 of harvester 10 will move downward under its own weight toward the ground. If harvester 10 moves too close to the ground, it may be moved upward by cranking downward on nut 100 against plate 96 to crank front end 32 of frame 22 back up. When the height is proper, bolt 90 is securely tightened. Dotted lines are also used to illustrate movement potential in FIG. 5.

Affixed to an angled metal bracing arrangement 48, which we consider a part of frame 22 located at both the front end of frame 22 and harvester 10, is a rotatable steel first shaft 42. First shaft 42 is preferably retained in roller bearing blocks. First shaft 42 is generally centered on front end 32 of frame 22. First shaft 42 is elongated, and is placed lengthwise with the ends of shaft 42 aiming at front end 32 and rear end 34 of frame 22. Affixed to the more forward end of first shaft 42, and extending outward from the front end of harvester 10 is a rigid metal power-take-off drive shaft 44 having a universal joint 46 affixed at each of two oppositely disposed ends thereof. Power-take-off drive shaft 44 is structured for removable attachment to the power-take-off unit of a suitably equipped tractor 12, and is used to transfer rotational power and movement from the power-take-off unit of the tractor 12 into rotational movement in first shaft 42.

Positioned directly above first shaft 42 is a rotatable steel fan support shaft 50. Fan support shaft 50 is also affixed to metal bracing arrangement 48, and is preferably centered on frame 22 and harvester 10. Shaft 50 is also preferably retained in roller bearing blocks. Fan support shaft 50 is elongated, and is placed lengthwise with the ends of shaft 50 aiming at front end 32 and rear end 34 of frame 22.

In order to transfer rotational movement from first shaft 42 to fan support shaft 50, a pulley and flexible drive belt arrangement is used. A large pulley 52 is affixed to first shaft 42, and a small pulley 54 is affixed to fan support shaft 50 above pulley 52. A flexible drive belt 56 is connected between the two pulleys 52 and 54. The two differently sized pulleys 52 and 54 are used to increase the RPM rate of fan support shaft 50 over that of first shaft 42, which is restricted by the normally quite slow rotational speed of a power-take-off unit of a tractor. Proper safety shrouding is placed and removably affixed around the pulley and belt arrangement between shafts 42 and 50, with the more forward end of first shaft 42 extending through the shrouding to allow attachment of PTO drive shaft 44. It is anticipated sprockets and a drive chain could replace pulleys 52, 54, and belt 56, although a drive chain has been found to require more maintenance than belt 56 in this situation.

Attached to the rearward end of fan support shaft 50 is a plastic or metal fan 58 structured to move air. Fan 58 is preferably made of metal for manufacturing cost reasons, and structured of individual bolt-on blades 60 to a center fan hub 61 to allow simple and cost effective replacement of the blades 60 when they become worn by debris 16 striking against them.

Affixed around fan 58 is a fan housing 62. Fan housing 62 is preferably made of heavy sheet metal and affixed with an interior replaceable plastic liner 64 to reduce wear on housing 62 from debris 16 passing therethrough. Fan housing 62 is supported in place by attachment to bracing members of frame 22 and other adjacent panels of harvester 10. Fan housing 62 preferably has a hinged access hatch 65 to allow access to fan 60. Fan housing 62 has a centered air and debris intake opening 66, and an air and debris exhaust opening 68. Air and debris exhaust opening 68 is aimed to one side of harvester 10 to direct debris 16 back out onto the ground. Air and debris intake opening 66 faces the rearward end of harvester 10.

Attached to fan housing 62 over air and debris intake opening 66 is the first end 72 of an elongated tubular vacuum chamber 70 formed of sheet metal panels. Vacuum chamber 70 is a long air duct opening at first end 72 thereof into fan housing 62, and opening at second end 74 thereof into the approximate center of a debris separation chamber 76. Vacuum chamber 70 extends rearward from fan housing 62 toward rear end 30 of harvester 10 before entering and merging centrally into debris separation chamber 76. Fan 58 is for drawing a large quantity of air through debris separation chamber 76, with the air picking up light weight debris 16, sucking both the air and airborne debris through vacuum chamber 70, through air and debris intake opening 66, and discharging the air and debris through air and debris exhaust opening 68.

Pivotally affixed within the interior of vacuum chamber 70 adjacent second end 74 and debris separation chamber 76 is a panel of metal or plastic, designated louver 78. Louver 78 is attached at its upper side by hinge 102 to allow pivoting, and is supported by a chain 80 affixed at its center lower edge. Air moving from debris separation chamber 76 into vacuum chamber 70 during harvesting maintains chain 80 taunt, and louver 78 stationary by applying pressure against the louver 78. Chain 80 extends upward to exit through an aperture in a top panel of debris separation chamber 76 where the upper end of chain 80 is releasably retained with a large cotter pin or other suitable retaining structure. Louver 78 spans generally across the width of vacuum chamber 70 between side panels 105 A, allowing air to pass between the bottom edge of louver 78 and bottom panel 104 of vacuum chamber 70. Louver 78 is used to adjust the suction or air currents between vacuum chamber 70 and debris separation chamber 76. Adjustments in placement of louver 78 are made by raising or lowering chain 80 and again affixing chain 80 in place. Adjusts are made in the position of louver 78 depending on the dampness, type or weight of agricultural items 14 and the debris 16 mixed therewith being harvested, and is primarily for concentrating suction on a smaller area evenly across conveyors within debris separation chamber 76. The concentration of suction is spread evenly across the width, or perpendicular relative to the elongated harvester 10 between front end 26 and rear end 30 thereof.

Figure 6:
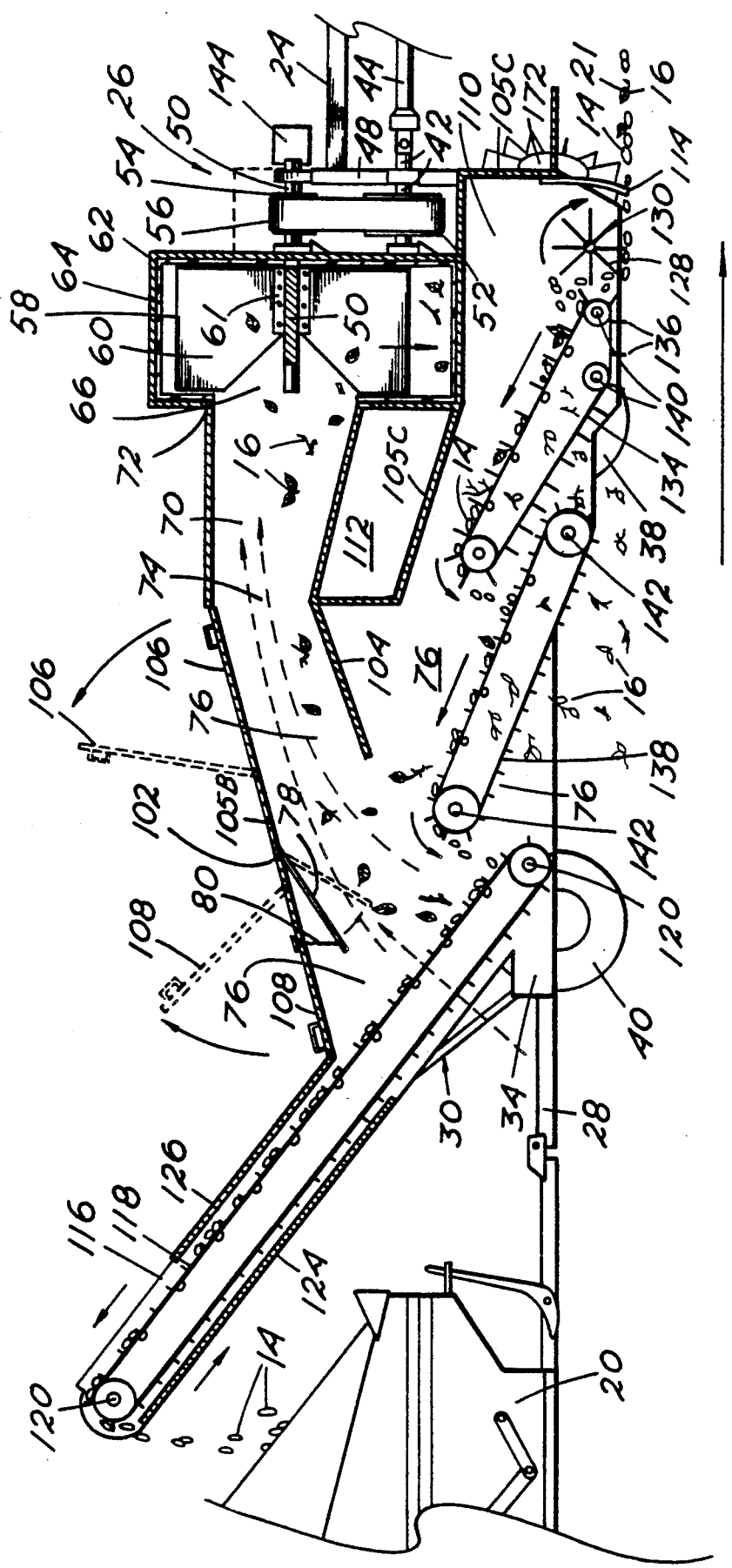
FIG. 6 is a sectional view into the left side of the preferred embodiment of our harvester.

Shown in FIG. 6 is a short rearward section of the interior bottom floor or panel of vacuum chamber 70, designated sloped panel 104. Sloped panel 104 spans between side panel 105 A shown in FIG. 1 and 2, and is sloped downward toward debris separation chamber 76 as shown in FIG. 6. Sloped panel 104 is useful in directing nuts or other agricultural items 14 which are inadvertently sucked into vacuum chamber 70, and which do not have sufficient momentum to reach fan 58. Air and lighter weight items moving rapidly from debris separation chamber 76 into vacuum chamber 70 have a tendency to concentrate in air currents upward above panel 104 due to angles in vacuum chamber 70 and the positioning of louver 78, creating an area directly adjacent panel 104 of relatively little draft. Agricultural items 14 which enter vacuum chamber 70 and lose momentum due to being excessively heavy or having improper aerodynamics to continue airborne, fall out of the main currents and onto sloped panel 104, and the vibration inherent to the operation of harvester 10 in combination with the slope of panel 104 causes the agricultural items 14 to slide back into debris separation chamber 76.

Figure 2:
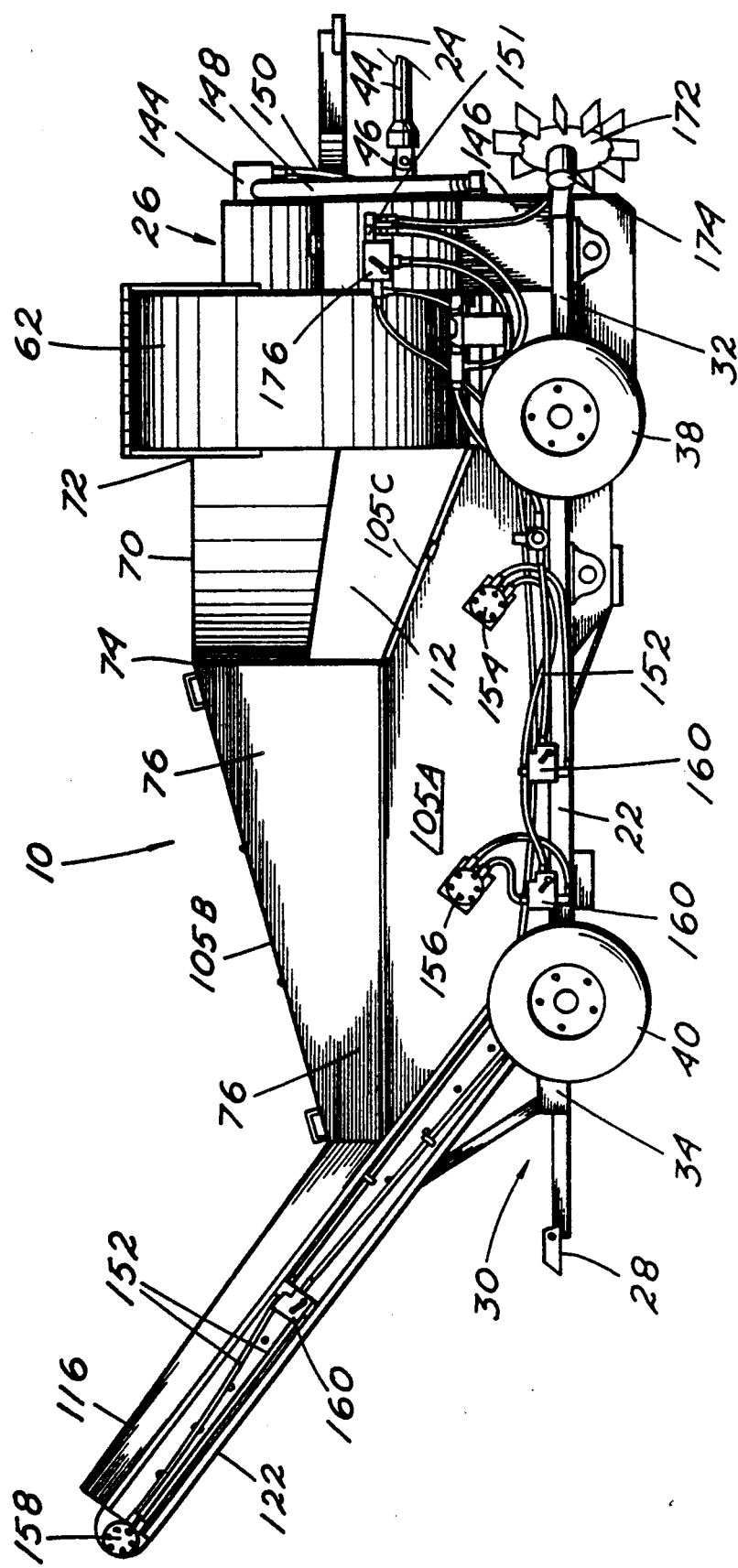
FIG. 2 is a left side view of our harvester.
Figure 3:
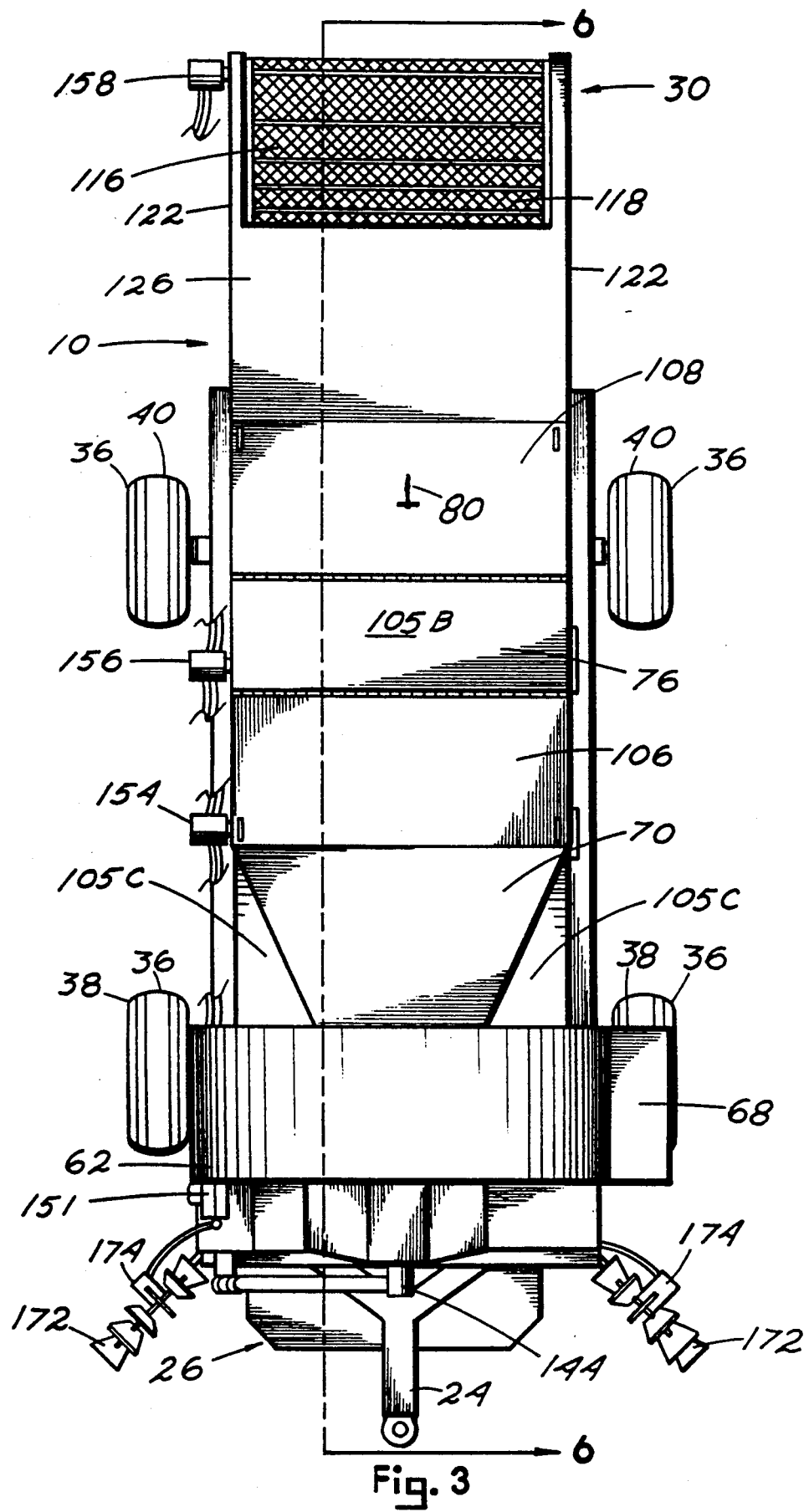
FIG. 3 is a top plan view of our harvester.

Debris separation chamber 76 is formed of a plurality bent and affixed together sheet metal panels which are secured in place on harvester 10 by bolting and welding to frame 22. The panels which form debris separation chamber 76 consist primarily of vertically oriented side panels 105 A and horizontally oriented top panels 105 B arranged and affixed together to provide a generally enclosed area located centrally on harvester 10. Positioned over openings in panels 105 B, across the top of debris separation chamber 76 are two hingidly attached access doors 106 and 108 as shown in both FIG. 3 and FIG. 6. In FIG. 6, doors 106 and 108 are also illustrated using dotted lines to show the doors in the open position. Doors 106 and 108 allow access to components within debris separation chamber 76 for servicing. Door 106, being the closest to front 26 of harvester 10 of the two doors is also at least partially positioned over the top of vacuum chamber 70 as may be seen in FIG. 6. Some of the panels which form and define vacuum chamber 70 and debris separation chamber 76 are common to both structures 70 and 76. It should be noted that there is actually no definite point at which second end 74 of vacuum chamber 70 ends, and debris separation chamber 76 begins, since the metal panels and the spaces defined by the metal panels merge together as shown in FIG. 2 and 6 generally below door 106.

Figure 1:
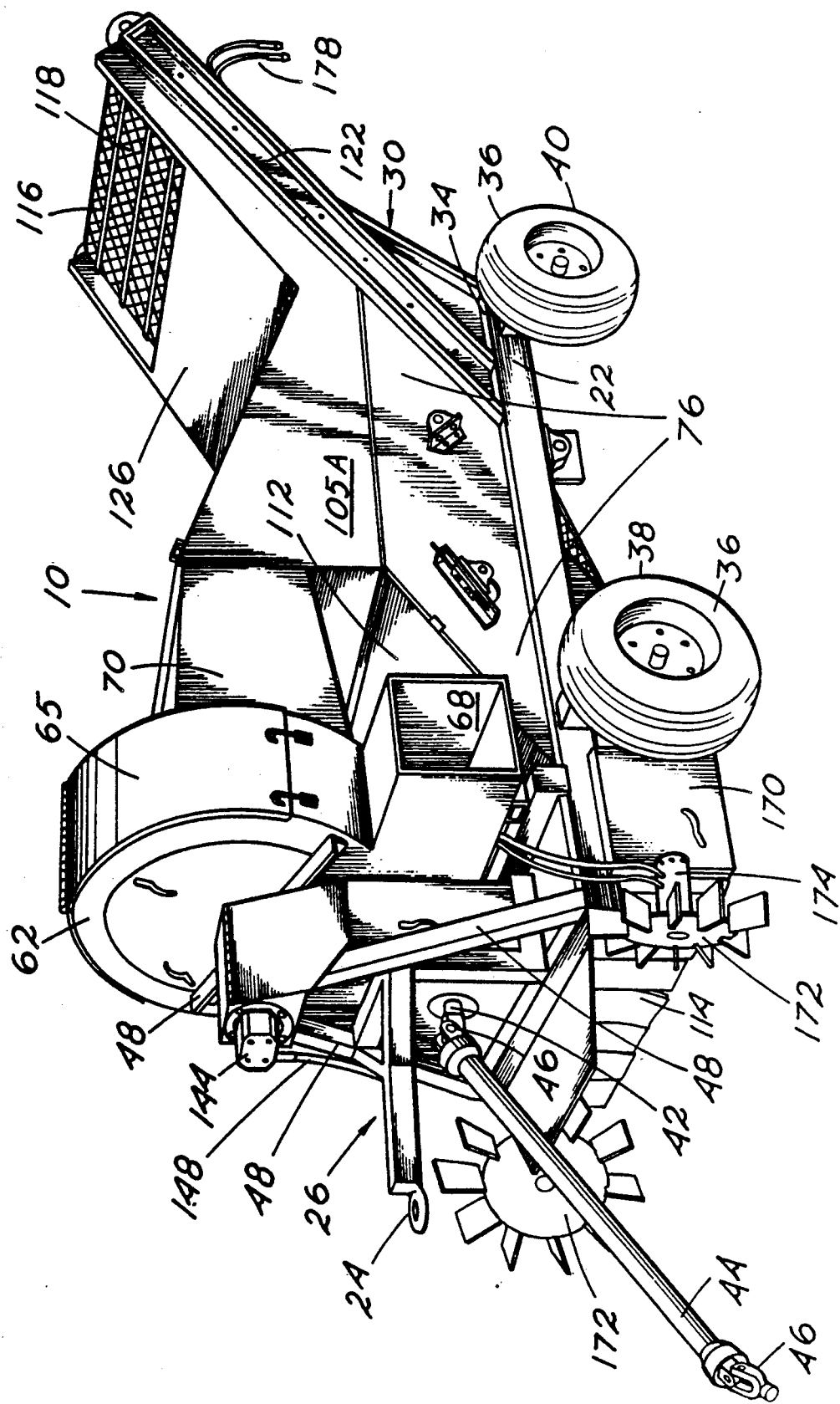
FIG. 1 is a right side front perspective view of the preferred embodiment of our harvester.

As may be ascertained from FIG. 1 and 2, side panels 105 A which form a part of, and help define debris separation chamber 76 extend along the length of the two oppositely disposed side edges of frame 22 from front end 26 of harvester 10 below fan housing 62 rearward to off-load elevator 116. Spanning generally horizontally between the two side panels 105 A is a Z-shaped panel 105 C, best shown in FIG. 6, which extends from front end 26 of harvester 10, under first shaft 42 and fan housing 62 before turning upward to terminate against a bottom panel of vacuum chamber 70 adjacent panel 104. An unused open passage or space 112 happens to left between the bottom of vacuum chamber 70 and the top of panel 105 C as may be seen in FIG. 1 and 2. Panels 105 A, 105 B, 105 C, and doors 106 and 108 form and generally define debris separation chamber 76. Panels 105 A and 105 C generally form and define an inclosed area, designated area 110 underneath first shaft 42 and fan housing 62 best seen in FIG. 6. Area 110 is positioned in front of debris separation chamber 76, and is partially in communication therewith. A flexible synthetic rubber panel 114 having a plurality of vertical slits therethrough is affixed to the front end of Z-shaped panel 105 C. Rubber panel 114 extends across the front width of harvester 10, and further extends downward to the ground as seen in FIG. 1 and 6. Panel 114 serves to close the front of area 110 while being flexible enough to allow a windrow 21 of agricultural items 14 to pass thereunder and through the slits into area 110 during harvesting. Panel 114 generally maintains an air seal to slow the in-rush of air around agricultural items 14 entering area 110, thereby helping to force the in-rush of air demanded by fan 58 to be through debris separation chamber 76, over and through the conveyors located therein, and then through vacuum chamber 70. The underside of debris separation chamber 76 as well as area 110 are left generally open to the ground to allow small and heavy debris 16 such as rocks and dirt to fall to the ground, and space is left between harvester 10 and the ground to allow the drawing of air from the bottom up, through and around the ends of the conveyors.

Figure 4:
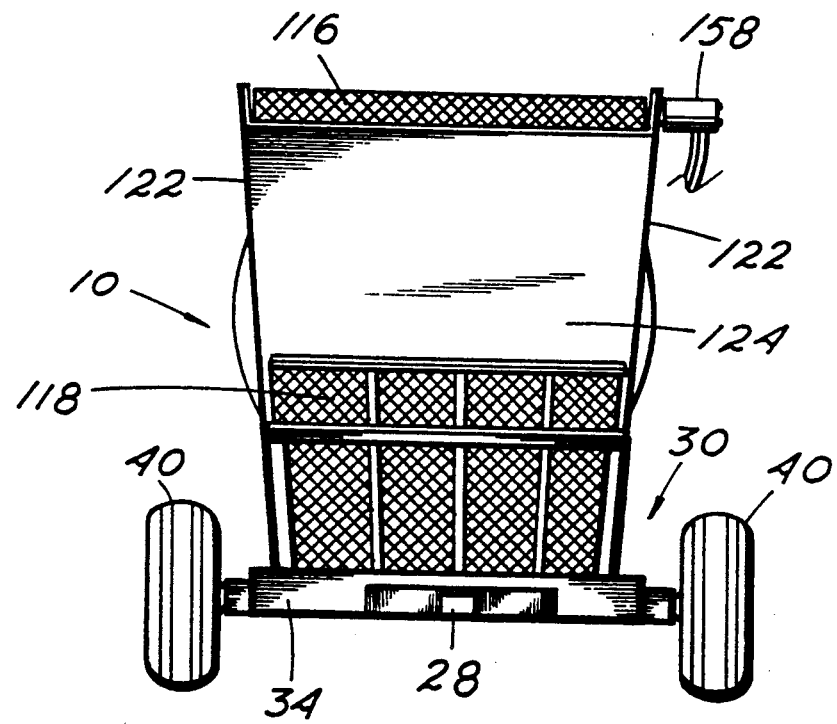
FIG. 4 is a view of the rear end of our harvester.
Figure 5:
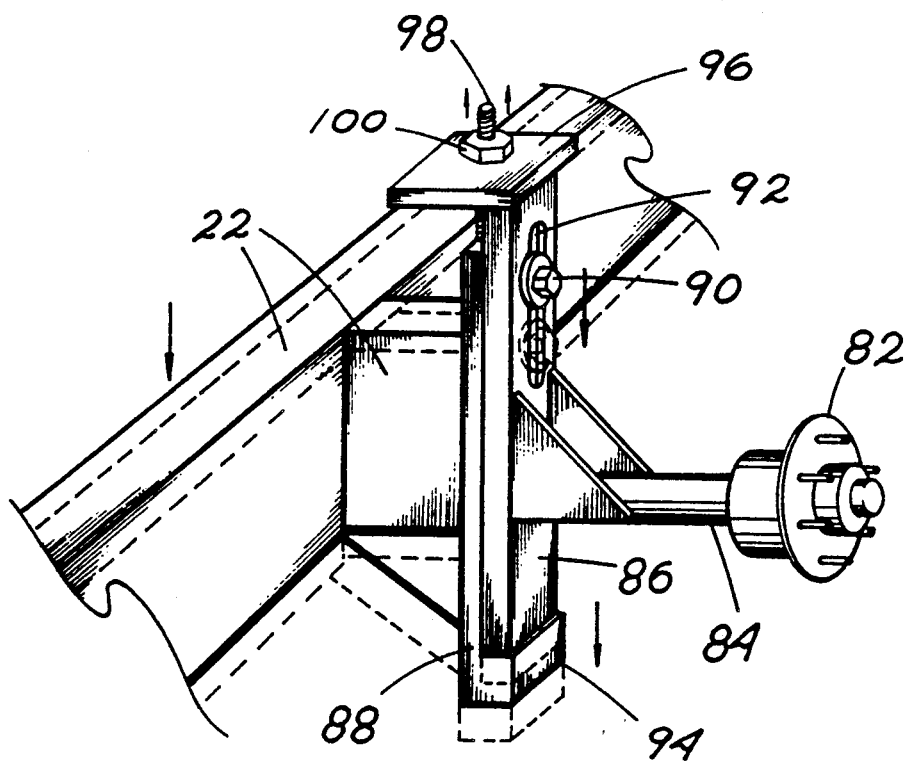
FIG. 5 is a view of the height adjustable attachment structure of one of the front wheels of our harvester.

Affixed to rear end 30 of harvester 10 is an off-load conveyor or elevator 116. Off-load elevator 116 includes a continuous loop of flexible, open-mesh conveyor chain 118 rotatably affixed to harvester 10 for conveying agricultural items from harvester 10 upward and outward over rear tow hitch 28 for deposit in a harvest trailer 20 under tow. Conveyor chain 118 may have a plurality of cleats or paddles affixed thereto, transversing the width of the elongated chain 118 to assist in the upward conveying of agricultural items 14 if necessary. Conveyor chain 118 is supported by rotatable support shafts 120, at least one support shaft 120 at each end of the two oppositely disposed folds in conveyor chain 118. Support shafts 120 are each in turn rotatably affixed to two framing members 122, one framing member 122 on each oppositely disposed side edge of conveyor chain 118. Framing members 122 are in turn affixed at the lower ends thereof to rear end 34 of frame 22. Framing members 122 extend upward and rearward at an angle from the attachments at frame 22. As shown in FIG. 6, the lower or forward end of off-load elevator 116 is located within debris separation chamber 76, and enclosed on the sides by panel 105 A. As shown in FIG. 4, the lower or forward end of off-load elevator 116 is open on the back side thereof, leaving conveyor chain 118 as the divider between debris separation chamber 76 and the exterior of harvester 10 in this area. Also shown in FIG. 4 and 6 is a sheet metal panel 124 affixed across framing member 122, with the lower edge of panel 124 terminating generally at the same level as the upper altitude of debris separation chamber 76. As shown in FIG. 1 is an upper panel 126 affixed to and across framing member 122. The lower edge of panel 126 abuts panel 105 B adjacent door 108, and extends upward from there to about the top of off-load elevator 116. Panel 124 and 126 help force air to be drawn through conveyor chain 118 during harvesting as a further attempt to remove remaining debris 16 with suction. Dirt may also fall through the lower end of the open conveyor chain 118 onto the ground.

Positioned within area 110 at front end 26 of harvester 10 adjacent panel 114 is an elongated rotatable feeder wheel 128 of which is partially illustrated in FIG. 6, and also shown in FIG. 8. Feeder wheel 128 parallels flexible panel 114 spanning between side panel 105 A. Feeder wheel 128 is supported on a rotatable center shaft 130 which has a plurality of flexible rubber paddles 132 affixed thereto. Paddles 132 are positioned to either touch or nearly touch the ground when rotating during harvesting. Each end of shaft 130 is affixed in roller bearing blocks, which in turn are affixed to either panels 105 A or portions of frame 22.

Referring now mainly to FIG. 6 and 8. Positioned rearward of feeder wheel 128 is a rotatable, continuous loop pick-up conveyor 134 which has a plurality of flexible cleats 136 affixed transversely thereto, with cleats 136 useful for picking up agricultural items 14 and debris 16 pushed against them by feeder wheel 128. Pick-up conveyor 134 is affixed to harvester 10 generally below fan 58 and vacuum chamber 70 at an angle as shown in FIG. 6, and generally spans the full width of harvester 10. The angled placement of pick-up conveyor 134 provides a lower front end adjacent feeder wheel 128 and the ground, and an upper rearward end place above and in space apart relationship to a lower forward end of dirt removal conveyor 138. The front end of pick-up conveyor 134 is considered to be within area 110, and the rear upper end of pick-up conveyor 134 is considered to be within the forward end of debris separation chamber 76. Pick-up conveyor 134 is supported by three rotatable support shafts 140, which in turn are affixed to side panel 105 A or frame 22 in roller bearing blocks. As shown in FIG. 6, the two more forward support shafts 140 are positioned generally at the same height off the ground whereby pick-up conveyor 134 is formed into a triangular shape. The triangular shape of pick-up conveyor 134 is intended to place at least two cleats 136 on or very closely adjacent the ground during harvesting for improved pick-up and forward sweeping of the ground. In FIG. 6 and 8, directional arrows are used to illustrate rotational direction of feeder wheel 128 relative to pick-up conveyor 134, as well as to illustrate rotation direction of dirt removal conveyor 138 and off-load elevator 116. As may be seen in FIG. 6, the front of feeder wheel 128 initially rotates downward toward the ground pushing agricultural items 14 and debris 16 into the forward located cleats 136 of pick-up conveyor 134 which are moving forward from the ground contacting position sweeping any missed items forward. Feeder wheel 128 helps load items 14 and 16 in between cleats 136 at the moment the forward moving cleats 136 change direction to move rearward on the upper layer of pick-up conveyor 134. Pick-up conveyor 134 may be apertured belting or chain, although we have found that non-apertured belting in this particular situation helps force air to be drawn through dirt removal conveyor 138, and to increase the amount of air drawn through debris 16 and agricultural items 14 free falling from pick-up conveyor 134 onto the front end of dirt removal conveyor 138, see FIG. 6.

Positioned rearward of pick-up conveyor 134 is dirt removal conveyor 138 affixed to harvester 10 at an angle, and generally spanning the full width of debris separation chamber 76. Dirt removal conveyor 138 is a continuous loop of flexible open or apertured chain supported by two rotatable support shafts 142, with the rearward shaft 142 placed upward relative to the more forward support shaft 142. Shafts 142 are each affixed to side panel 105 A or frame 22 and supported in roller bearing blocks. The angled affixment of dirt removal conveyor 138 provides a lower forward end placed under and in spaced apart relationship from the upper rearward end pick-up conveyor 134 to receive items falling therefrom, and an upper rearward end positioned above and in spaced apart relationship from the lower forward end of off-load elevator 116 in order to off-load onto elevator 116. Dirt removal conveyor 138 is considered to be completely within debris separation chamber 76. The apertures in dirt removal conveyor 138 are sized sufficiently small to prohibit agricultural items 14 from falling therethrough, and yet are sufficiently large to allow small rocks and other debris 16 to fall through onto the ground. The apertures in dirt removal conveyor 138 also allow the drawing of air therethrough helping to cause some of the lighter debris 16 to go airborne and be sucked through vacuum chamber 70 and discharged out onto the ground. The afore description of the apertures in dirt removal conveyor 138 is generally applicable to the apertures in elevator 116. It is anticipated an apertured rubber belt could be substituted for the chain of dirt removal conveyor 138 or elevator 116.

Affixed stationary to metal bracing 48 is a hydraulic fluid pump 144 shown in FIG. 1 and 2. The input shaft of pump 144, which is not shown, is coupled to the forward end of fan support shaft 50 so that when shaft 50 rotates, pump 144 is actuated and pumps hydraulic fluid. Shown best in FIG. 2 is a hydraulic fluid reservoir tank 146 having a hydraulic fluid supply line 148 affixed thereto, with opposite end of the line 148 affixed to the input side of pump 144. A hydraulic fluid supply line 150 extends from the high pressure output side of pump 144 to a hydraulic fluid distribution center 151 for distribution throughout a plurality of hydraulic fluid distribution feed and return lines 152. Hydraulic fluid distribution feed and return lines 152 extend to and from various hydraulic motors on harvester 10.

One hydraulic motor 154 is connected to one end of one of the support shafts 140 of pick-up conveyor 134 to cause rotation in the conveyor 134 when actuated. Another hydraulic motor 156 is connected to one end of one of the support shafts 142 of dirt removal conveyor 138 to cause rotation in the conveyor 138 when actuated. A third hydraulic motor 158 is attached to one end of one of the support shafts 120 of elevator 116, preferably the upper rearward shaft 120, to cause rotation in elevator 116 when actuated. A single high pressure hydraulic fluid line extends from hydraulic fluid distribution center 151 to power motors 154, 156, and 158. Centering type hydraulic control valves 160, one valve 160 for each hydraulic motor is connected into the high pressure hydraulic fluid line prior to fluid being applied to the hydraulic motor. Centering type hydraulic control valves 160 and the fluid lines connecting the valves 160 and the hydraulic motors 154, 156, and 158 are connected to form a combination series and parallel fluid circulatory conductive system. Depending of the settings of the control levers on valves 160, hydraulic motors 154, 156, and 158 may be controlled independently of each other, allowing variable speed control of each motor and the conveyors they power.

Referring now to FIG. 7 where a short drive chain and sprocket arrangement is shown, the structure used to transfer rotational movement and power from one of the support shafts 140 of pick-up conveyor 134, which is powered by hydraulic motor 154 into simultaneous rotation of center support shaft 130 of feeder wheel 128. As shown, a small sprocket 162 is attached to the end of shaft 140. A large sprocket 164 is attached to the end of shaft 130. Two idler sprockets 166 are rotatably affixed above the center point of shaft 130. A drive chain 168 is affixed around sprocket 162, across the top and meshed with sprocket 164 and then around both idler sprockets 166. This drive chain and sprocket arrangement allows shaft 140 to rotate in one direction, while shaft 130 is rotated in an opposite direction, see FIG. 6. As shown in FIG. 1, a removable safety guard 170 is affixed over the drive chain 168 and sprocket arrangement.

Shown best in FIG. 1 and 2 are two rotary paddle wheels 172, one affixed at each side of front end 26 of harvester 10. These optional paddle wheels 172 are used when harvesting particulary wide windrows 21. Most often these unusually wide windrows 21 are particulary wide due to large quantities of leaves, a common situation associated with pecans. The flexible rubber paddles of paddle wheels 172 rotate adjacent the ground to push the windrows 21 into more narrow strips just prior to the front 26 of harvester 10 moving over the windrow 21. Paddle wheels 172 are each powered by a hydraulic motor 174 affixed to the backside thereof, with both motors 174 being controlled by a single centering type control valve 176.

In FIG. 1, a set of capped hydraulic fluid lines 178 are shown dangling from the end of elevator 116. This optional set of lines 178 are used to power harvest trailers 20 which require hydraulic power to operate stick and branch removal chains affixed over the top of the trailer. Hydraulic fluid lines 178 are connected on the pressured side of hydraulic pump 144.

Although we have described our invention sufficiently for those skilled in the art to both make and use the preferred embodiment of the invention, our descriptions and drawings are for example and illustrative purposes only, and are not intended to limit the scope of this patent to less than that of the appended claims.

What we claim as our invention is:

1. An improved harvester adapted for towing through an orchard by a tractor to pick-up agricultural items and debris mixed with the agricultural items on a ground surface, remove a portion of the debris from the agricultural items, and then deposit the agricultural items into a trailer under tow by said harvester, said harvester comprising in combination:

a frame having two tow hitches, one of said two tow hitches affixed to a front end of said frame at a front end of said harvester, and one of said two tow hitches affixed to a rear end of said frame at a rear end of said harvester;

wheels rotatably affixed to said harvester providing mobility to said harvester for towing;

a rotatable first shaft affixed to and generally centered on said front end of said harvester, said first shaft having linkage means affixed thereto having means for coupling rotational movement from a power-take-off unit of the tractor to said first shaft;

a rotatable fan support shaft affixed to and generally centered on said front end of said harvester, said fan support shaft further positioned generally above said first shaft;

flexible connecting means affixed to and between said first shaft and said fan support shaft, said flexible connecting means including means to transfer rotational movement in said first shaft to said fan support shaft;

a suction fan mounted to said fan support shaft at said front end of said harvester;

a fan housing affixed around said fan, said fan housing having an air and debris intake opening and further having an air and debris exhaust opening;

an elongated tubular vacuum chamber, a first end of said vacuum chamber affixed to said fan housing over said air and debris intake opening, said vacuum chamber extending rearward from said fan housing toward said rear end of said harvester, a second end of said vacuum chamber entering generally centrally into a debris separation chamber positioned generally centered on said harvester, said vacuum chamber in open communication with said debris separation chamber, an adjustably positionable louver pivotally affixed within said vacuum chamber adjacent said debris separation chamber, said louver having means to provide a degree of adjustable control over air passing from said debris separation chamber into said vacuum chamber, said vacuum chamber having at least a portion of an interior floor thereof sloped downward toward said debris separation chamber, the downward sloped floor of said vacuum chamber having means to guide agricultural items which have inadvertently entered said vacuum chamber back into said debris separation chamber;

said debris separation chamber formed of a plurality of panels supported by said frame, said panels placed and affixed together to provide a generally enclosed area having a generally open bottom, said generally open bottom providing a path for air intake drawn through said debris separation chamber into said vacuum chamber by said fan, said generally open bottom further providing an exit for relatively small and heavy debris to fall from within said debris separation chamber onto the ground;

a rotatable feeder wheel affixed to and across said front end of said harvester, said feeder wheel disposed partially in contact with the ground during harvesting, said feeder wheel having means to rotate and push the agricultural items and debris mixed therewith rearward into a rotatable pick-up conveyor;

said rotatable pick-up conveyor positioned rearward of said feeder wheel, said pick-up conveyor having a plurality of flexible cleats affixed thereto, said pick-up conveyor affixed to said harvester positioned generally below said fan and said vacuum chamber and at least partially within said debris separation chamber, said pick-up conveyor positioned at an angle providing a lower front end and an upper rearward end of said pick-up conveyor, said lower front end of said pick-up conveyor positioned adjacent said feeder wheel and further positioned to provide ground contact of at least two of said cleats at a time during harvesting, said pick-up conveyor having means to lift and move agricultural items and debris from the ground rearward, said upper rearward end of said pick-up conveyor positioned above and in spaced apart relationship to a lower front end of an apertured dirt removal conveyor positioned rearward of said pick-up conveyor;

said dirt removal conveyor rotatably affixed to said harvester and positioned generally within said debris separation chamber, said dirt removal conveyor further positioned on said harvester at an angle providing said lower front end and an upper rearward end of said dirt removal conveyor, said lower front end of said dirt removal conveyor positioned below and in spaced apart relationship to said upper rearward end of pick-up conveyor, and further positioned to receive agricultural items and debris falling from said pick-up conveyor, said upper rearward end of said dirt removal conveyor positioned above and in spaced apart relationship to a lower front end of an off-load elevator positioned rearward of said dirt removal conveyor;

said off-load elevator rotatably affixed to said harvester positioned at an angle providing said lower front end and an upper rearward end of said off-load elevator, said lower front end of said elevator positioned below said upper rearward end of said dirt removal conveyor to receive agricultural items falling from said dirt removal conveyor, said upper rearward end of said off-load elevator positioned generally over said one of said two tow hitches affixed to said rear end of said frame, at least a portion of said lower front end of said off-load elevator positioned within said debris separation chamber;

a hydraulic fluid pump affixed to said harvester and coupled to said fan support shaft with said coupling adapting rotational movement in said fan support shaft to provide powering to operate said hydraulic fluid pump;

a hydraulic fluid reservoir and fluid line attached to said harvester to supply hydraulic fluid to said hydraulic fluid pump;

a first hydraulic motor affixed to said harvester and further coupled to a rotatable support shaft of said pick-up conveyor, said first hydraulic motor and said coupling thereof having means to provide rotational movement in said pick-up conveyor;

connecting means between a rotatable support shaft of said feeder wheel and a rotatable support shaft of said pick-up conveyor having means to transfer rotational movement in said pick-up conveyor into simultaneous rotational movement in said feeder wheel;

a second hydraulic motor affixed to said harvester and further coupled to a rotatable support shaft of said dirt removal conveyor, said second hydraulic motor and said coupling thereof having means to provide rotational movement in said dirt removal conveyor;

a third hydraulic motor affixed to said harvester and further coupled to a rotatable support shaft of said off-load elevator, said third hydraulic motor and said coupling thereof having means to provide rotational movement in said off-load elevator;

hydraulic fluid lines connecting said first, said second and said third hydraulic motors into a pressured fluid side of said hydraulic fluid pump;

hydraulic fluid control valves placed in said hydraulic fluid lines for providing individual control of each of said hydraulic motors.

2. An improved harvester according to claim 1 wherein at least two front wheels of said wheels affixed to said harvester are affixed with structuring to provide selective height adjustability of at least said front end of said harvester towards and away from the ground.

3. An improved harvester according to claim 1 wherein said linkage means affixed to said first shaft for coupling rotational movement from a power-take-off unit of the tractor to said first shaft includes a drive shaft having a universal joint affixed at each of two ends thereof.

4. An improved harvester according to claim 1 wherein said flexible connecting means affixed to and between said first shaft and said fan support shaft includes a pulley and flexible drive belt arrangement to transfer rotational movement in said first shaft to said fan support shaft.

5. An improved harvester according to claim 1 with said connecting means between said rotatable support shaft of said feeder wheel and said rotatable support shaft of said pick-up conveyor having means to transfer rotational movement in said pick-up conveyor into simultaneous rotational movement in said feeder wheel, wherein said connecting means includes at least two sprockets and a drive chain.

6. An improved harvester adapted for towing through an orchard by a tractor to pick-up agricultural items and debris mixed with the agricultural items on a ground surface, remove a portion of the debris from the agricultural items, and then deposit the agricultural items into a trailer under tow by said harvester, said harvester comprising in combination:

a frame having two tow hitches, one of said two tow hitches affixed to a front end of said frame at a front end of said harvester, and one of said two tow hitches affixed to a rear end of said frame at a rear end of said harvester;

wheels rotatably affixed to said harvester providing mobility to said harvester for towing;

a rotatable first shaft affixed to said front end of said harvester, said first shaft having linkage means affixed thereto having means for coupling rotational movement from a power-take-off unit of the tractor to said first shaft;

a rotatable fan support shaft affixed to said front end of said harvester, said fan support shaft further positioned generally above said first shaft;

flexible connecting means affixed to and between said first shaft and said fan support shaft, said flexible connecting means having means to transfer rotational movement in said first shaft to said fan support shaft;

a suction fan mounted to said fan support shaft at said front end of said harvester;

a fan housing affixed around said fan, said fan housing having an air and debris intake opening and further having an air and debris exhaust opening;

an elongated tubular vacuum chamber, a first end of said vacuum chamber affixed to said fan housing over said air and debris intake opening, said vacuum chamber extending rearward from said fan housing toward said rear end of said harvester, a second end of said vacuum chamber entering generally centrally into a debris separation chamber on said harvester, said vacuum chamber in open communication with said debris separation chamber;

said debris separation chamber formed of a plurality of panels affixed to said harvester, said panels placed and affixed together to provide a generally enclosed area having a generally open bottom, said generally open bottom providing a path for air intake drawn through said debris separation chamber into said vacuum chamber by said fan, said generally open bottom further providing an exit for relatively small and heavy debris to fall from within said debris separation chamber onto the ground;

a rotatable feeder wheel affixed to and across said front end of said harvester, said feeder wheel disposed partially in contact with the ground during harvesting, rotational powering means connected to a rotatable support in said feeder wheel, said feeder wheel having means to rotate and push the agricultural items and debris mixed therewith into a rotatable pick-up conveyor;

said rotatable pick-up conveyor positioned rearward of said feeder wheel, said pick-up conveyor having a plurality of flexible cleats affixed thereto, said pick-up conveyor affixed to said harvester positioned at least partially within said debris separation chamber, said pick-up conveyor positioned at an angle providing a lower front end and an upper rearward end of said pick-up conveyor, said lower front end of said pick-up conveyor positioned adjacent said feeder wheel and further positioned to provide ground contact of at least one of said cleats at a time during harvesting, rotational powering means connected to a rotatable support shaft of said pick-up conveyor for causing rotational movement in said pick-up conveyor, said pick-up conveyor having means to lift and move agricultural items and debris from the ground rearward, said upper rearward end of said pick-up conveyor positioned above and in spaced apart relationship to a lower front end of an apertured dirt removal conveyor positioned rearward of said pick-up conveyor;

said dirt removal conveyor rotatably affixed to said harvester and positioned generally within said debris separation chamber, said dirt removal conveyor further positioned on said harvester at an angle providing said lower front end and an upper rearward end of said dirt removal conveyor, said lower front end of said dirt removal conveyor positioned below and in spaced apart relationship to said upper rearward end of pick-up conveyor, and further positioned to receive agricultural items and debris falling from said pick-up conveyor, said upper rearward end of said dirt removal conveyor positioned above and in spaced apart relationship to a lower front end of an off-load elevator positioned rearward of said dirt removal conveyor, rotational powering means connected to a rotatable support shaft of said dirt removal conveyor for causing rotational movement in said dirt removal conveyor;

said off-load elevator rotatably affixed to said harvester positioned at an angle providing said lower front end and an upper rearward end of said off-load elevator, said lower front end of said elevator positioned below said upper rearward end of said dirt removal conveyor to receive agricultural items falling from said dirt removal conveyor, said upper rearward end of said off-load elevator positioned generally over said one of said two tow hitches affixed to said rear end of said frame, at least a portion of said lower front end of said off-load elevator positioned within said debris separation chamber, rotational powering means connected to a rotatable support shaft of said off-load elevator for causing rotational movement in said off-load elevator.

7. An improved harvester according to claim 6 wherein at least two front wheels of said wheels affixed to said harvester are affixed with structuring to provide selective height adjustability of at least said front end of said harvester towards and away from the ground.

8. An improved harvester according to claim 6 wherein said linkage means affixed to said first shaft for coupling rotational movement from a power-take-off unit of the tractor to said first shaft includes a drive shaft having a universal joint affixed at each of two ends thereof.

9. An improved harvester according to claim 6 wherein said flexible connecting means affixed to and between said first shaft and said fan support shaft includes a pulley and flexible drive belt arrangement having means to transfer rotational movement in said first shaft to said fan support shaft.

10. An improved harvester according to claim 6 wherein said rotational powering means connected to said rotatable support shaft of said feeder wheel for causing rotational movement therein includes a first sprocket connected to said rotatable support shaft of said feeder wheel and second sprocket connected to a rotatable support shaft of said pick-up conveyor, and further including a drive chain affixed over both said sprockets to transfer rotational movement from said pick-up conveyor to said feeder wheel.

11. An improved harvester according to claim 6 wherein said rotational powering means connected to said rotatable support shaft of said pick-up conveyor includes a hydraulically powered motor.

12. An improved harvester according to claim 6 wherein said rotational powering means connected to said rotatable support shaft of said dirt removal conveyor includes a hydraulically powered motor.

13. An improved harvester according to claim 6 wherein said rotational powering means connected to said support shaft of said off-load elevator includes a hydraulically powered motor.

14. An improved harvester adapted for towing through an orchard by a tractor to pick-up agricultural items and debris mixed with the agricultural items on a ground surface, remove a portion of the debris from the agricultural items, and then deposit the agricultural items into a trailer under tow by said harvester, said harvester comprising in combination:

a frame having two tow hitches, one of said two tow hitches affixed to a front end of said frame at a front end of said harvester, and one of said two tow hitches affixed to a rear end of said frame at a rear end of said harvester;

wheels rotatably affixed to said harvester providing mobility to said harvester for towing;

a rotatable first shaft affixed to and generally centered on said front end of said harvester, said first shaft having linkage means affixed thereto having means for coupling rotational movement from a power-take-off unit of the tractor to said first shaft;

a rotatable fan support shaft affixed to and generally centered on said front end of said harvester, said fan support shaft further positioned generally above said first shaft;

flexible connecting means affixed to and between said first shaft and said fan support shaft, said flexible connecting means including means to transfer rotational movement in said first shaft to said fan support shaft;

a suction fan mounted to said fan support shaft at said front end of said harvester;

a fan housing affixed around said fan, said fan housing having an air and debris intake opening and further having an air and debris exhaust opening;

an elongated tubular vacuum chamber, a first end of said vacuum chamber affixed to said fan housing over said air and debris intake opening, said vacuum chamber extending rearward from said fan housing toward said rear end of said harvester, a second end of said vacuum chamber entering generally centrally into a debris separation chamber on said harvester, said vacuum chamber in open communication with said debris separation chamber;

said debris separation chamber formed of a plurality of panels affixed to said harvester, said panels placed and affixed together to provide a generally enclosed area having a generally open bottom, said generally open bottom providing a path for air intake drawn through said debris separation chamber into said vacuum chamber by said fan, said generally open bottom further providing an exit for relatively small and heavy debris to fall from within said debris separation chamber onto the ground;

agricultural item and debris pick-up means affixed to said harvester positioned at least partially within said debris separation chamber and further positioned at least partially adjacent the ground, said pick-up means including debris separation and discarding means, said pick-up means further including conveyor means including means for off-loading agricultural items into a trailer under tow by said harvester;

powering means for said agricultural item and debris pick-up means, said powering means including power transferring means, said power transferring means including means adapted to transfer rotational movement received through said linkage means from the power-take-off unit of the tractor into said powering means.

* * * * *